Patented Oct. 6, 1953

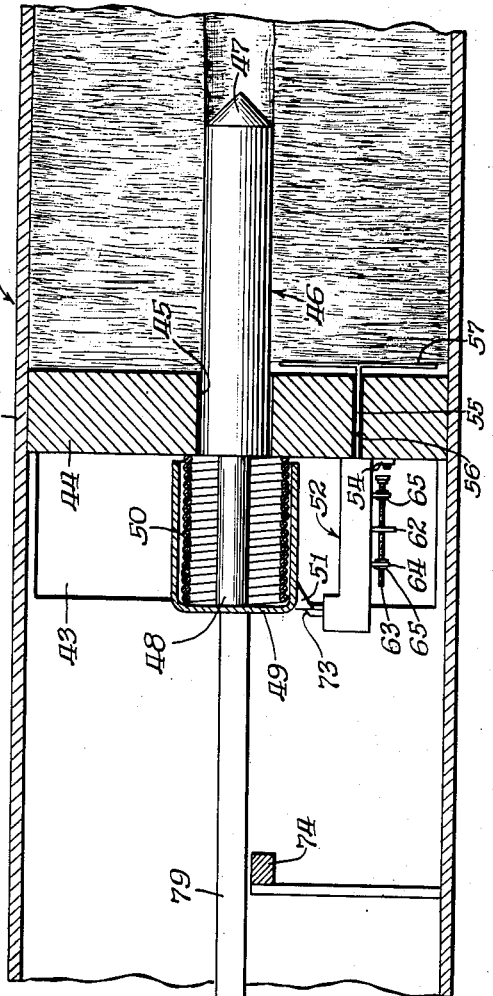

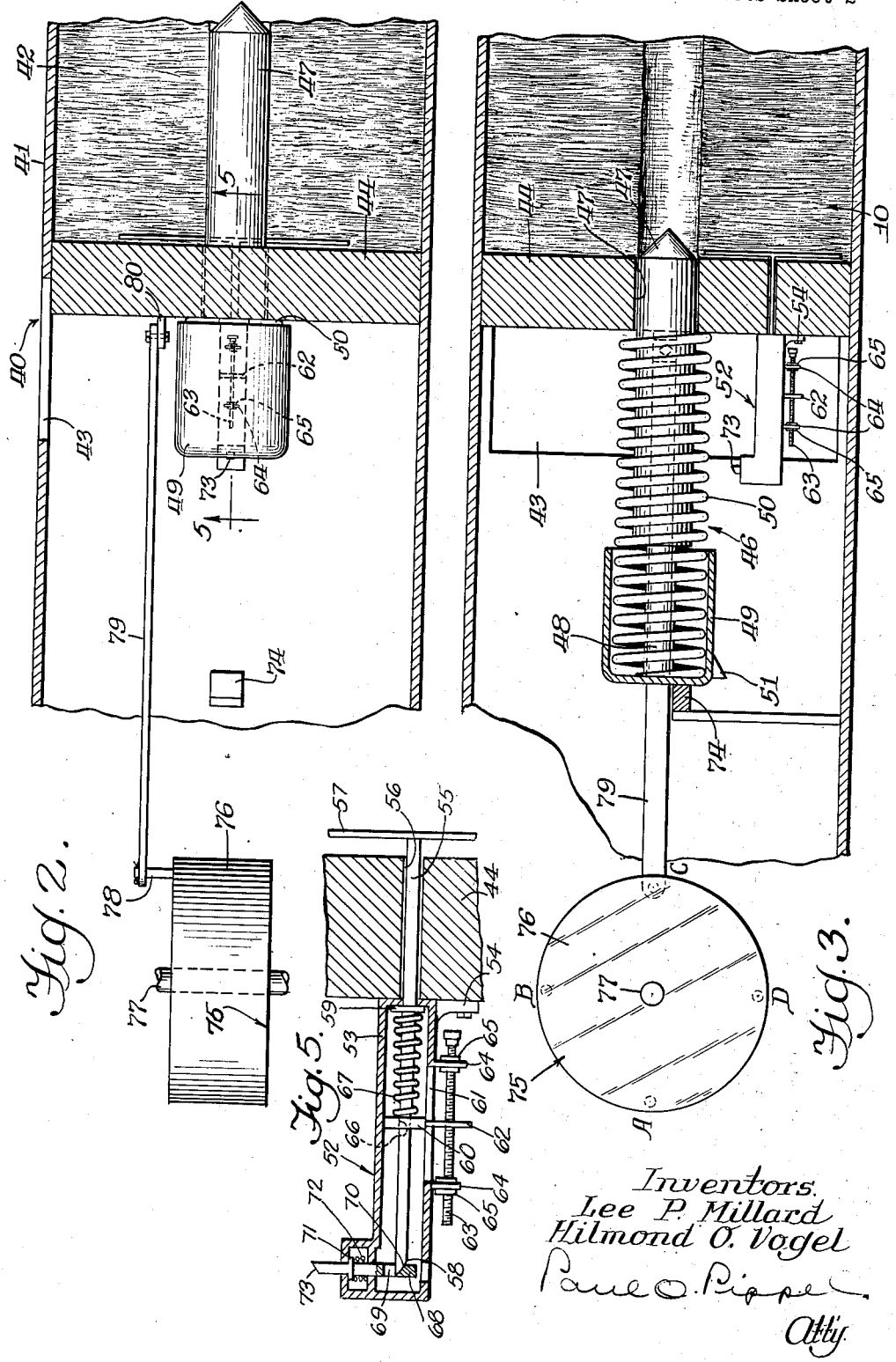

2,654,308

UNITED STATES PATENT OFFICE 2,654,308

BALER PRESS MECHANISM FOR FORMING VENTED BALES

Lee P. Millard and Hilmond O. Vogel, Chicago, Ill., assignors to International Harvester Company, a corporation of New Jersey Application April 18, 1951, Serial No. 221,618

5 Claims. (Cl. 100—50)

This invention relates to a baling press. More specifically the invention relates to baling presses having an improved mechanism for compressing bales of cut vegetation and for piercing a ventilating opening through the bales during their formation.

The type of baling press to which the present invention is especially adapted may be of a conventional type and structure including generally a compressing chamber and a plunger which is reciprocally positioned within the chamber to compress and form bales of detached vegetation. The basic construction of such a baling press is well shown in the Woodward Patent 833,104 patented October 9, 1906. In presses of this type the bales are compressed into separate units suitably tied and discharged from the baler. Vegetation which is cut in the field is usually dried before baling. However, it has been found that under certain circumstances the vegetation is not thoroughly dry and when the bales have been formed and stored, deterioration of the vegetation sets in. This is particularly true throughout the center of the bale since the air cannot suitably penetrate to this point for drying the baled vegetation. In the development of the baler art, this problem has been recognized and attempts to solve it have been made. In certain types of balers, the plunger is integrally formed with a spike or piercing implement, the spike being arranged to reciprocate with the baling plunger and to simultaneously form a centrally located opening in the bale during the compression stroke of the plunger.

Baling presses utilizing a plunger with an integral spike for forming venting openings have been only partially successful. As the plunger compresses the bale, the piercing member, of course, also tends to form an opening in the bale. However, as the plunger is retracted from its compression stroke the piercing member is also simultaneously retracted from the compressed bale. Since this retraction of the plunger and piercing member is simultaneous, withdrawal of the piercing member generally causes the vegetation to collapse around the venting opening and the effective action of the piercing member is greatly reduced. Applicant has recognized this difficulty and has developed an improved piercing mechanism for a baling press, this piercing member being arranged to move independently of the plunger to a retracted position while the plunger still is in a position wherein the material is compressed. In this manner a clearly defined venting opening is left in the compressed bale thereby effectively accomplishing the purpose for which the piercing mechanism is utilized.

It is a prime object therefore to provide an improved piercing mechanism associated with a reciprocating plunger for piercing openings in a bale during the compression stroke of the plunger.

It is another object to provide a piercing mechanism for forming ventilated openings in compressed bales, the piercing member including a spike which is reciprocally positioned with respect to a baling plunger so that the piercing member and plunger can move relative to one another.

A still further object is to provide an improved baler having a compression plunger, the plunger including an opening through which a piercing member may be actuated or reciprocated to effectuate piercing of a compressed bale thereby forming a ventilated opening therein.

Still another object is to provide a piercing mechanism for forming ventilated bales, the piercing mechanism including means for moving the compression plunger of the baler, said piercing mechanism having a plurality of spikes designed to reciprocate through openings in the plunger for piercing a plurality of ventilated openings in a compressed bale.

A still further object is to provide an improved baling mechanism, the mechanism including a baler having a plunger carrying a piercing mechanism, the piercing mechanism including a spike reciprocally positioned with respect to the plunger and including a resilient mechanism for retracting the spike from a baling chamber prior to the withdrawal of the plunger from its compressing position.

Another object is to provide an improved plunger and piercing mechanism for a baler including a spike which is reciprocally mounted with respect to the plunger, the spike including a spring connected thereto, the spring being held in a captive position and being releasable for withdrawing the spike from the plunger.

A further object is to provide a piercing mechanism for forming ventilated bales, the piercing mechanism including a spike operable to move relative to the compressed bale and the baling plunger in response to a pressure responsive mechanism associated with the plunger.

These and further objects will become more readily apparent from a reading of the specification taken in connection with the accompanying sheets of drawings.

In the drawings:

Fig. 1 is a sectional view in elevation of a baling mechanism showing portions of a baling plunger and a piercing mechanism therefor in section, the view also including an actuating means for the plunger and the piercing mechanism in schematic form.

Fig. 2 is a plan view of the plunger and piercing mechanism shown in Fig. 1, the sides of the baling chamber in this view being shown in section.

Fig. 3 is a sectional view similar to Fig. 1, this view showing a piercing mechanism in a retracted position with respect to the reciprocating plunger of the baling mechanism.

Fig. 4 is a view of the baling mechanism shown in Figs. 1, 2, and 3, this view showing the piercing member and a baling plunger in a retracted position prior to the initiation of the compression stroke of the plunger.

Fig. 5 is a cross-sectional view in elevation through a latch mechanism, the view being taken substantially along the line 5—5 of Fig. 2.

Referring to the drawings, a baling mechanism is generally designated by the reference character 40. An enclosure 41 defines a compressing chamber 42 having a feed opening 43. A plunger 44 is positioned for reciprocation within the chamber 42, this plunger including a centrally disposed opening 45.

A piercing mechanism is generally designated by the reference character 46, the piercing member including a spike 47 which is reciprocally positioned within the opening 45. The spike 47 includes a narrow shank 48, the shank being connected at one end to a cup-shaped housing 49. A captive spring 50 encircles the narrow shank 48. A cammed stop 51 is connected to the underneath side of the housing 49. A latch mechanism generally designated at 52 is connected to the plunger 44. As best shown in Fig. 5 the latch mechanism 52 comprises a casing 53 which is connected by means of a bolt 54 to the plunger 44. A rod 55 is reciprocally positioned within the casing 53. The rod 55 extends through an opening 56 formed in the plunger 44. A pressure responsive plate 57 is connected to the rod 56 for moving the rod in a first longitudinal direction. One end of the rod 55 is provided with a cam surface 58.

A collar 59 is rigidly fastened on the rod 55. A movable collar 60 encircles the rod 55. A slot 61 is formed in a lower portion of the casing 53, the collar 60 including an arm 62 which projects through the slot 61 below the casing 53. An elongated screw 63 is carried on bearing supports 64 which project downwardly from the casing. The screw 63 is threaded through the arm 62, and rotation of the screw effectuates movement of the arm 62 and the collar 60. Bearing 65 rotatably support the screw 63 on the supports 64. The collar 60 is provided with a centrally disposed opening 66 of slightly larger diameter than the rod 55 so that the collar 60 can move freely relative to said rod. A spring 67 is held captive between the collars 59 and 60, the spring normally urging the rod 55 to the position shown in Fig. 5.

A vertical pin 68 is suitably supported within the casing 53. The pin 68 is provided with a slot 69, one end of the slot 69 including a cam surface 70. A collar 71 connected to the pin 68 limits the vertical movement of said pin. A spring 72 normally urges the pin 68 to remain in the position shown in Fig. 5. The outermost tip of the pin 68 is provided with a cam surface 73. A stationary stop 74 is suitably supported within the enclosure 41, the stop 74 being positioned in the path of movement of the cup-shaped housing 49 for a purpose which will be described presently.

An actuating mechanism for reciprocating the plunger 44 is designated by the reference character 75. The actuating mechanism includes a fly-wheel 76 which is journaled on a shaft 77. The fly-wheel 76 includes a pivot arm 78 which is pivotally connected to a connecting rod 79. The connecting rod 79 is pivotally connected to an ear 80 suitably fastened to the plunger 44.

*Operation*

In the position shown in Fig. 1 the plunger 44 is in the compressing position wherein the vegetation is tightly compressed. The piercing spike 47 as shown has pierced an opening in the compressed vegetation. As the plunger 44 is moved to the maximum length of the connecting rod 79 and a predetermined compression of the vegetation is effected, the pressure responsive plate 57 is moved toward the plunger 44 and the rod 55 is moved against the action of the spring 67. In view of the relation of the camming surfaces 58 and 70, the vertical pin 73 is moved downwardly whereby it is disengaged from the cammed stop 51. The spring 50 is positioned at one end in engagement with the plunger 44. As the cup-shaped housing 49 is released from the latch 73, the spring 50 urges the housing and the piercing member 47 rearwardly with respect to the plunger 44. As shown in Fig. 3, the piercing member 47 is substantially withdrawn from the chamber 42 and the withdrawal is limited by the stationary stop 74 which is engaged by the housing 49.

As the fly-wheel rotates, the point of connection of the connecting rod 79 is moved from point C through D to point A. As the plunger is retracted within the enclosure, the plunger is moved against the spring 50 thereby compressing the same to the compressed position shown in Fig. 4. At this point the cam surface 73 rides over the cammed stop 51 until the vertical pin 68 again is latched with respect to the stop 51. This latching connection is clearly shown in Fig. 4, and the piercing member and the plunger are again ready for the next step in the operation, namely, the compressing and piercing action of the bale. The plunger and the piercing member are again moved toward the compressed vegetation whereupon the piercing member 47 is effective to pierce and maintain a vent opening within the formed bale.

The tension of the spring 67 of the latch mechanism 52 may be adjusted by rotating the screw 63. The latch mechanism can therefore be regulated so that a certain pressure against the pressure responsive plate 57 will be effective to overcome the action of the spring 67 to effectuate movement of the rod 55 thereby releasing the spring 50 to effectuate withdrawal of the piercing member 47.

It can be seen that the form of the invention shown and described operates in accordance with the objects of the invention. The plunger will compress the vegetation, and before retraction of the plunger takes place the piercing member is withdrawn. After the piercing member is withdrawn the plunger is again moved to its starting position whereupon the piercing mechanism is cocked or placed into position for the subsequent piercing action which in this case is simultaneous with the compression of the bale.

It is believed that the objects of the invention have been fully achieved by the novel structures set forth. The bale is compressed by a plunger, and while the bale is under compression the piercing action takes place. Thus a single or a plurality of ventilating openings may be formed in a bale, these openings being formed in such a manner that the shape of the bale and the openings will be maintained therein during the forming operation. Due to the novel action of the piercing mechanism employed, the openings are formed so that they will remain within the bale despite long periods of storage. Openings formed by this mechanism will retain their shape and will effectively provide for venting of the interior portions of the vegetation.

It must be realized that changes may be made which do not depart from the spirit of the invention as disclosed or from the scope thereof as defined in the appended claims.

What is claimed is:

1. A bale forming mechanism for forming ventilated bales comprising a bale compressing chamber, a plunger positioned for reciprocation within said chamber, said plunger having an opening therethrough, means connected to said plunger for reciprocating the same, toward and away from bale material in said chamber a bale piercing mechanism associated with said plunger, said mechanism including a piercing member reciprocally positioned in the opening and adapted to project outwardly from the plunger into the compressing chamber, means for moving said piercing member in a direction away from said chamber and said plunger including a spring connected to said piercing member, said spring being normally compressed during the movement of said plunger toward said bale material whereby said plunger is moved with the piercing member for compressing and piercing an opening in a bale, a latch engaging said spring for locking said spring in the compressed position, a release means for said latch, said release means including a pressure responsive member movable with the plunger, means connecting said pressure responsive member with said latch whereby during a predetermined pressure on said pressure responsive means said latch is released and said spring is released from compression thereby substantially withdrawing said piercing member from said chamber and moving the same relative to said plunger, and means engaging said spring for compressing the same to again lock said spring in engagement with the latch during movement of the plunger away from the formed bale whereby said piercing member again projects from the plunger into said compressing chamber.

2. A bale forming mechanism in accordance with claim 1 wherein said spring engaging means includes a stationary stop positioned in the path of movement of said piercing member.

3. A bale forming mechanism for forming ventilated bales comprising a bale compressing chamber, a plunger positioned for reciprocation within said bale compressing chamber, said plunger having an opening extending therethrough, means for reciprocating said plunger within said chamber, a piercing member reciprocally positioned within said opening, said piercing member projecting from the plunger into said chamber, said piercing member and said plunger being movable toward and into engagement with material in said bale compressing chamber for compressing a bale and piercing an opening therein, a spring connected to said piercing member and associated with said plunger for normally urging said piercing member to substantially withdraw from the chamber and move relative to said plunger, latch means for normally restraining said spring under compression, pressure responsive means within said chamber connected to said latch means, said latch means being arranged to release said spring at a predetermined pressure on said pressure responsive means whereby said piercing member is moved relative to said plunger, into retracted position, and means engageable with said spring during movement of said plunger away from the formed bale for compressing said spring whereby the latch element engages and restrains said spring under compression.

4. A bale forming mechanism for forming ventilated bales comprising a bale compressing chamber, a plunger positioned for reciprocation within said bale compressing chamber, said plunger having an opening extending therethrough, means for reciprocating said plunger within said chamber, a piercing member reciprocally positioned within said opening, said piercing member projecting from the plunger into said chamber, said piercing member and said plunger being movable toward and into engagement with material in said bale compressing chamber for compressing a bale and piercing an opening therein, a spring connected to said piercing member and associated with said plunger for normally urging said piercing member to substantially withdraw from the chamber and move relative to said plunger, latch means for normally restraining said spring under compression, and pressure responsive means within said chamber connected to said latch means, said latch means being arranged to release said spring at a predetermined pressure on said pressure responsive means whereby said piercing member is moved relative by said spring to said plunger into retracted position.

5. A bale forming mechanism for forming ventilated bales comprising a bale compressing chamber, a plunger positioned for reciprocation with said chamber, said plunger having an opening therethrough, means for reciprocating said plunger, a piercing member reciprocally positioned within the plunger, said piercing member normally projecting from the plunger into the chamber, a spring connected to said piercing member for urging said piercing member to move longitudinally relative to said plunger and to retract from said chamber, and a latch for normally maintaining the piercing member in the projecting position relative to said plunger and against the spring action of said spring, said latch including a pressure responsive means, the pressure responsive means being constructed and arranged to release the latch and spring at a predetermined pressure on said pressure responsive means whereby said spring retracts said piercing member from said chamber.

LEE P. MILLARD.
HILMOND O. VOGEL.

References Cited in the file of this patent

UNITED STATES PATENTS

| Number | Name | Date |
|---|---|---|
| 860,284 | Deaton | July 16, 1907 |
| 970,930 | Kingham | Sept. 20, 1910 |
| 1,045,125 | Dain | Nov. 26, 1912 |
| 2,420,923 | West | May 20, 1947 |